US007520266B2

(12) United States Patent
Barnes et al.

(10) Patent No.: US 7,520,266 B2
(45) Date of Patent: Apr. 21, 2009

(54) FUEL INJECTOR CONTROL SYSTEM AND METHOD

(75) Inventors: Travis E. Barnes, Metamora, IL (US); Rammohan Sankar, Peoria, IL (US); Clayton D. Walenta, Peoria, IL (US); Christopher F. Gallmeyer, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 528 days.

(21) Appl. No.: 11/443,318

(22) Filed: May 31, 2006

(65) Prior Publication Data

US 2007/0289576 A1 Dec. 20, 2007

(51) Int. Cl.
*F02M 37/04* (2006.01)
*F02M 57/02* (2006.01)
*G06F 19/00* (2006.01)

(52) U.S. Cl. .................... 123/446; 123/506; 123/198 D; 123/198 DB; 701/107; 701/112

(58) Field of Classification Search ................. 123/446, 123/447, 506, 467, 494, 198 D, 198 DB; 701/103, 112, 107, 114
See application file for complete search history.

(56) References Cited

U.S. PATENT DOCUMENTS

| | | | |
|---|---|---|---|
| 5,893,516 | A | 4/1999 | Harcombe et al. |
| 5,915,623 | A | 6/1999 | Knight et al. |
| 5,915,624 | A | 6/1999 | Coldren et al. |
| 5,934,559 | A | 8/1999 | Coldren et al. |
| 5,939,963 | A | 8/1999 | Harcombe |
| 5,947,380 | A | 9/1999 | Coldren et al. |
| 5,971,300 | A | 10/1999 | Coldren et al. |
| 5,975,437 | A | 11/1999 | Streicher et al. |
| 5,984,208 | A | 11/1999 | Martin et al. |

(Continued)

FOREIGN PATENT DOCUMENTS

| | | |
|---|---|---|
| EP | 1 321 660 | 3/2003 |

(Continued)

OTHER PUBLICATIONS

PCT International Search Report; File Reference: 06-402; International Application No. PCT/US2007/009319; International Filing Date: Apr. 17, 2007; Priority Date: May 31, 2006; Applicant: Caterpiller Inc.

*Primary Examiner*—Thomas N Moulis
(74) *Attorney, Agent, or Firm*—Finnegan, Henderson, Farabow, Garrett & Dunner

(57) ABSTRACT

A fuel injector for an engine is disclosed. The fuel injector has a plunger disposed within a bore, a nozzle member, a valve needle, a check valve, a spill valve, and a controller. The check valve is movable between a first position at which the valve needle is communicated with the bore, and a second position at which the valve needle is fluidly communicated with a drain. The spill valve is movable between a first position at which fuel flows from the bore to the drain, and a second position at which the fuel from the bore is blocked. The controller moves the spill valve toward its second position and the check valve toward its second position during a downward displacing movement of the plunger. The controller detects an unsuccessful movement of the check valve to the second position, and prematurely halts the current injection event in response to the detection.

20 Claims, 4 Drawing Sheets

U.S. PATENT DOCUMENTS

| | | | | |
|---|---|---|---|---|
| 5,986,871 | A | 11/1999 | Forck et al. | |
| 6,000,638 | A | 12/1999 | Martin | |
| 6,167,869 | B1 | 1/2001 | Martin et al. | |
| 6,328,017 | B1 * | 12/2001 | Heinz et al. | 123/467 |
| 6,394,072 | B1 * | 5/2002 | Yoshida et al. | 123/506 |
| 6,439,202 | B1 * | 8/2002 | Carroll et al. | 123/467 |
| 6,457,457 | B1 | 10/2002 | Harcombe | |
| 6,561,164 | B1 | 5/2003 | Mollin | |
| 6,725,147 | B2 | 4/2004 | Mollin | |
| 6,856,222 | B1 | 2/2005 | Forck | |
| 7,413,160 | B2 * | 8/2008 | Beilharz et al. | 251/30.01 |
| 2004/0079335 | A1 * | 4/2004 | Rodriguez-Amaya et al. | 123/446 |
| 2004/0163626 | A1 | 8/2004 | Stockner et al. | |
| 2005/0045149 | A1 * | 3/2005 | Udd et al. | 123/446 |

FOREIGN PATENT DOCUMENTS

| | | |
|---|---|---|
| EP | 1 321 660 | 6/2003 |
| WO | WO 00/52326 | 9/2000 |

* cited by examiner

FILL

PRESSURIZE

BEGIN INJECTION AT VOP

END INJECTION

SPILL

FUEL INJECTOR CONTROL SYSTEM AND METHOD

TECHNICAL FIELD

The present disclosure is directed to a control system and method and, more particularly, to a system and method for controlling operation of a fuel injector.

BACKGROUND

Internal combustion engines such as diesel engines, gasoline engines, and gaseous fuel powered engines use injectors to introduce fuel into the combustion chambers of the engine. These injectors may be hydraulically or mechanically actuated with mechanical, hydraulic, or electrical control of fuel delivery. One example of a mechanically-actuated, electronically-controlled fuel injector is described in U.S. Pat. No. 6,856,222 (the '222 patent) issued to Forck on Feb. 15, 2005.

The '222 patent describes a fuel injector having a spring-biased, solenoid-controlled spill valve and a spring-biased, solenoid-controlled direct operating check valve (DOC valve). Both the spill valve and the DOC valve are associated with a cam-driven plunger and a control chamber of a valve needle. As the plunger is initially forced by a cam into a bore within the fuel injector, fuel from within the bore flows past the spill valve to a low pressure drain. When the spill valve is electrically closed during further movement of the plunger into the bore, pressure within the bore builds. When an injection of fuel is desired, the DOC valve is electronically moved to connect the control chamber to the low pressure drain, thus permitting movement of the valve needle away from a seating to commence injection. To end injection, the DOC valve disconnects the control chamber from the low pressure drain to return the valve needle to its seating. The time during which the valve needle is away from its seating determines the quantity of fuel injected.

Although the injector of the '222 patent may sufficiently inject fuel into the combustion chambers of an engine, it may lack a damage protection protocol. In particular, following the closing of the spill valve during the downward displacement of the cam-driven plunger, if the DOC valve does not properly close to initiate injection, the rising pressure of the fuel within the injector could reach levels sufficient to damage the injector.

The control system of the present disclosure solves one or more of the problems set forth above.

SUMMARY OF THE INVENTION

One aspect of the present disclosure is directed to a fuel injector. The fuel injector includes a plunger reciprocatingly disposed within a bore, a nozzle member having a tip end with at least one orifice, and a valve needle having a base end and tip end. The valve needle is disposed within the nozzle member, and is movable against a spring bias from a flow blocking position at which substantially no fuel flows through the at least one orifice, to a flow passing position at which fuel flows through the at least one orifice. The fuel injector also includes a check valve in fluid communication with the bore and the base end of the valve needle. The check valve is movable between a first position at which the base end of the valve needle is fluidly communicated with the bore, and a second position at which the base end of the valve needle is fluidly communicated with a drain. The fuel injector further includes a spill valve associated with the bore and movable between a first position at which fuel flows from the bore to the drain, and a second position at which fuel from the bore is blocked from the drain. The fuel injector additionally includes a controller in communication with the check valve and the spill valve. The controller is configured to move the spill valve toward its second position during a downward displacing movement of the plunger to build pressure within the bore, and to also move the check valve toward its second position during the downward displacing movement of the plunger. The controller is further configured to detect an unsuccessful movement of the check valve to the second position, and prematurely halt the current injection event in response to the detection.

Another aspect of the present disclosure is directed to a method of operating a fuel injector. The method includes displacing fuel, blocking a flow of the displaced fuel to pressurize the displaced fuel, and directing the pressurized fuel to at least one orifice and to the base end of a valve needle blocking the at least one orifice. The method also includes attempting to lower the pressure of the fuel at the base end of the valve needle to allow pressurized fuel to flow through the at least one orifice, and detecting an unsuccessful attempt to lower the pressure. The method further includes prematurely unblocking the flow of displaced fuel in response to the detection.

DETAILED DESCRIPTION

Figure 1:
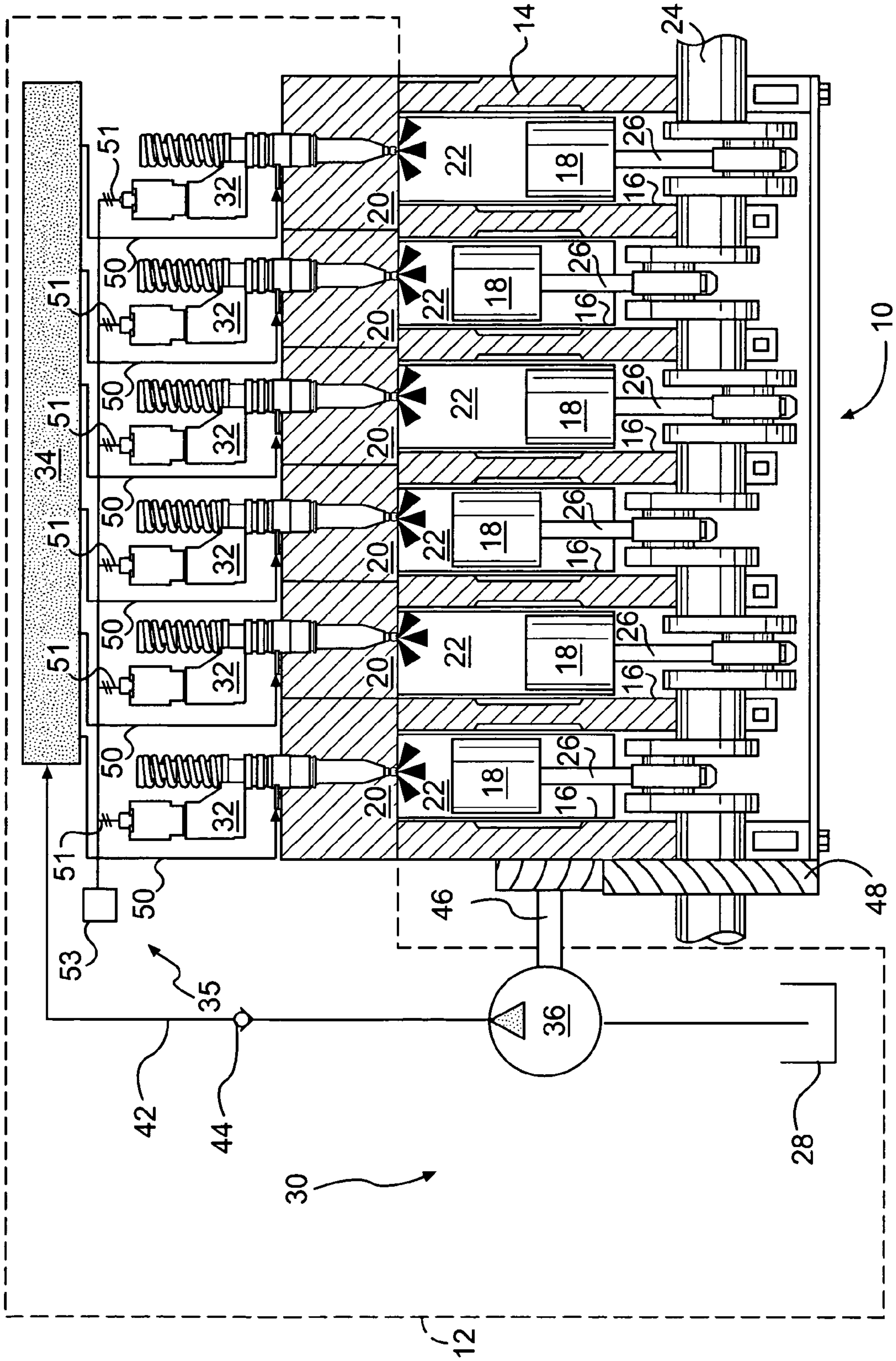
FIG. 1 is a schematic and diagrammatic illustration of an exemplary disclosed fuel system.

FIG. 1 illustrates an engine 10 and an exemplary embodiment of a fuel system 12. For the purposes of this disclosure, engine 10 is depicted and described as a four-stroke diesel engine. One skilled in the art will recognize, however, that engine 10 may be any other type of internal combustion engine such as, for example, a gasoline or a gaseous fuel-powered engine. Engine 10 may include an engine block 14 that defines a plurality of cylinders 16, a piston 18 slidably disposed within each cylinder 16, and a cylinder head 20 associated with each cylinder 16.

Cylinder 16, piston 18, and cylinder head 20 may form a combustion chamber 22. In the illustrated embodiment, engine 10 includes six combustion chambers 22. However, it is contemplated that engine 10 may include a greater or lesser number of combustion chambers 22 and that combustion chambers 22 may be disposed in an "in-line" configuration, a "V" configuration, or any other suitable configuration.

As also shown in FIG. 1, engine 10 may include a crankshaft 24 that is rotatably disposed within engine block 14. A connecting rod 26 may connect each piston 18 to crankshaft 24 so that a sliding motion of piston 18 within each respective cylinder 16 results in a rotation of crankshaft 24. Similarly, a rotation of crankshaft 24 may result in a sliding motion of piston 18.

Fuel system 12 may include components that cooperate to deliver injections of pressurized fuel into each combustion chamber 22. Specifically, fuel system 12 may include a tank 28 configured to hold a supply of fuel, a fuel pumping arrangement 30 configured to pressurize the fuel and direct the pressurized fuel to a plurality of fuel injectors 32 by way of a manifold 34, and a control system 35.

Fuel pumping arrangement 30 may include one or more pumping devices that function to increase the pressure of the fuel and direct one or more pressurized streams of fuel to manifold 34. In one example, fuel pumping arrangement 30 includes a low pressure source 36. Low pressure source 36 may embody a transfer pump configured to provide low pressure feed to manifold 34 via a fuel line 42. A check valve 44 may be disposed within fuel line 42 to provide for one-directional flow of fuel from fuel pumping arrangement 30 to manifold 34. It is contemplated that fuel pumping arrangement 30 may include additional and/or different components than those listed above such as, for example, a high pressure source disposed in series with low pressure source 36, if desired.

Low pressure source 36 may be operatively connected to engine 10 and driven by crankshaft 24. Low pressure source 36 may be connected with crankshaft 24 in any manner readily apparent to one skilled in the art where a rotation of crankshaft 24 will result in a corresponding rotation of a pump drive shaft. For example, a pump driveshaft 46 of low pressure source 36 is shown in FIG. 1 as being connected to crankshaft 24 through a gear train 48. It is contemplated, however, that low pressure source 36 may alternatively be driven electrically, hydraulically, pneumatically, or in any other appropriate manner.

Fuel injectors 32 may be disposed within cylinder heads 20 and connected to manifold 34 by way of a plurality of fuel lines 50. Each fuel injector 32 may be operable to inject an amount of pressurized fuel into an associated combustion chamber 22 at predetermined timings, fuel pressures, and quantities. The timing of fuel injection into combustion chamber 22 may be synchronized with the motion of piston 18. For example, fuel may be injected as piston 18 nears a top-dead-center position in a compression stroke to allow for compression-ignited-combustion of the injected fuel. Alternatively, fuel may be injected as piston 18 begins the compression stroke heading towards a top-dead-center position for homogenous charge compression ignition operation. Fuel may also be injected as piston 18 is moving from a top-dead-center position towards a bottom-dead-center position during an expansion stroke for a late post injection to create a reducing atmosphere for aftertreatment regeneration. In order to accomplish these specific injection events, engine 10 may request an injection of fuel from control system 35 at a specific start of injection (SOI) timing, a specific start of injection pressure, a specific end of injection (EOI) pressure, and/or may request a specific quantity of injected fuel.

Control system 35 may control operation of each fuel injector 32 in response to one or more inputs. In particular, control system 35 may include a controller 53 that communicates with fuel injectors 32 by way of a plurality of communication lines 51. Controller 53 may be configured to control a fuel injection timing, pressure, and amount by applying a determined current waveform or sequence of determined current waveforms to each fuel injector 32.

Controller 53 may embody a single microprocessor or multiple microprocessors that include a means for controlling an operation of fuel injector 32. Numerous commercially available microprocessors can be configured to perform the functions of controller 53. It should be appreciated that controller 53 could readily embody a general machine or engine microprocessor capable of controlling numerous machine or engine functions. Controller 53 may include all the components required to run an application such as, for example, a memory, a secondary storage device, and a processor, such as a central processing unit or any other means known in the art for controlling fuel injectors 32. Various other known circuits may be associated with controller 53, including power supply circuitry, signal-conditioning circuitry, solenoid driver circuitry, communication circuitry, and other appropriate circuitry.

Figure 2:
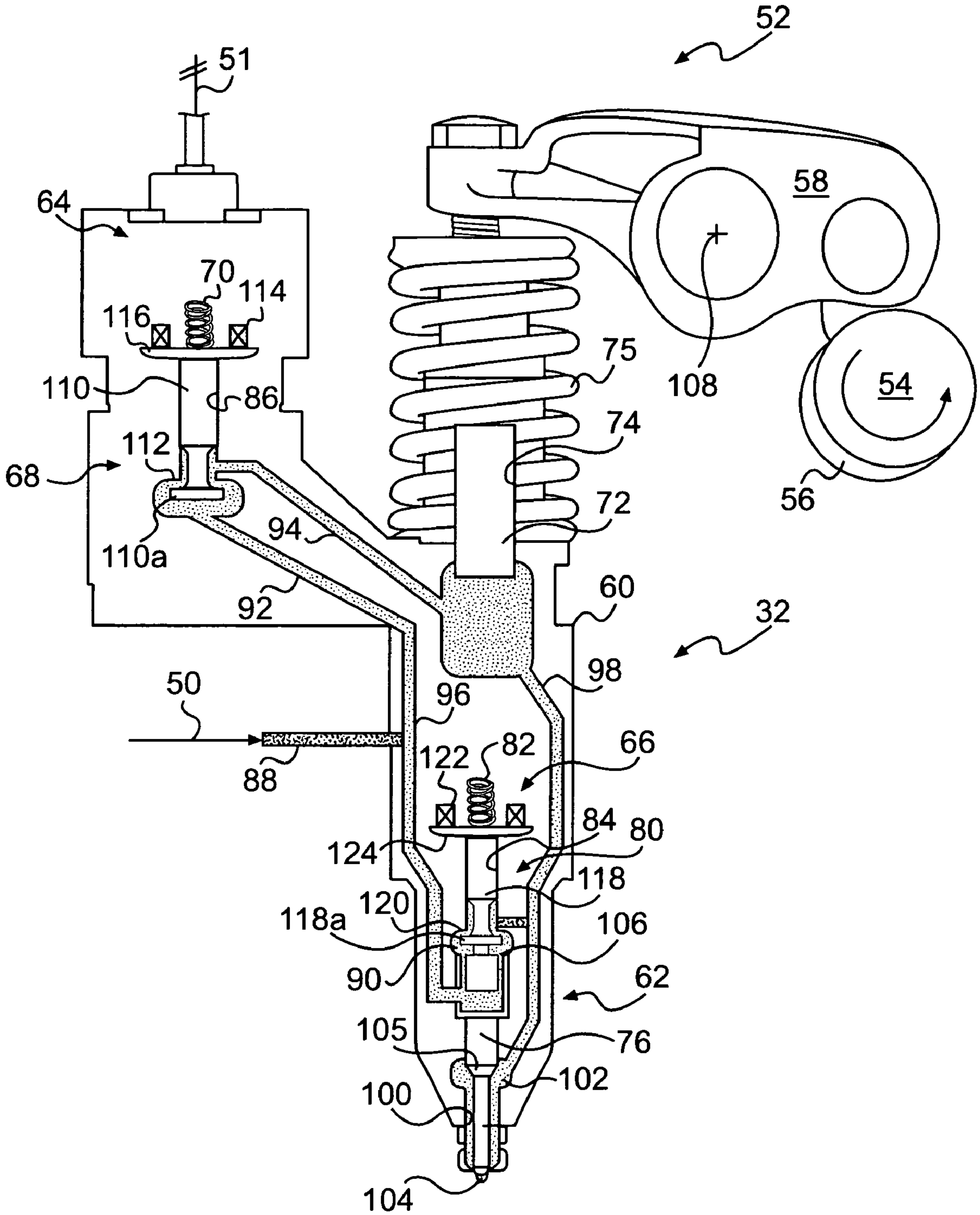
FIG. 2 is a cut-away view illustration of an exemplary disclosed fuel injector for the fuel system of FIG. 1.

As illustrated in FIG. 2, each fuel injector 32 may embody a mechanically-operated pump-type unit fuel injector. Specifically, each fuel injector may be driven by a cam arrangement 52 to selectively pressurize fuel within fuel injector 32 to a desired pressure level. Cam arrangement 52 may include a cam 54 operatively connected to crankshaft 24 such that a rotation of crankshaft 24 results in a corresponding rotation of cam 54. For example, cam arrangement 52 may be connected with crankshaft 24 through a gear train (not shown), through a chain and sprocket arrangement (not shown), through a cog and belt arrangement (not shown), or in any other suitable manner. As will be described in greater detail below, during rotation of cam 54, a lobe 56 of cam 54 may periodically drive a pumping action of fuel injector 32 via a pivoting rocker arm 58. It is contemplated that the pumping action of fuel injector 32 may alternatively be driven directly by lobe 56 without the use of rocker arm 58, or that a pushrod (not shown) may be disposed between rocker arm 58 and fuel injector 32, if desired.

Fuel injector 32 may include multiple components that interact to pressurize and inject fuel into combustion chamber 22 of engine 10 in response to the driving motion of cam arrangement 52. In particular, each fuel injector 32 may include a injector body 60 having a nozzle portion 62, a plunger 72 disposed within a bore 74 of injector body 60, a plunger spring 75, a valve needle 76, a valve needle spring (not shown), a spill valve 68, a spill valve spring 70, a first electrical actuator 64, a direct operated check (DOC) valve 80, a DOC spring 82, and a second electrical actuator 66. It is contemplated that additional or different components may be included within fuel injector 32 such as, for example, restricted orifices, pressure-balancing passageways, accumulators, and other injector components known in the art.

Injector body 60 may embody a generally cylindrical member configured for assembly within cylinder head 20 and having one or more passageways. Specifically, injector body 60 may include bore 74 configured to receive plunger 72, a bore 84 configured to receive DOC valve 80, a bore 86 configured to receive spill valve 68, and a control chamber 90. Injector body 60 may also include a fuel supply/return line 88 in communication with bores 86, 74, 84, control chamber 90, and nozzle portion 62 via fluid passageways 92, 94, 96, and 98, respectively. Control chamber 90 may be in direct communication with valve needle 76 and selectively drained of or supplied with pressurized fuel to affect motion of valve needle 76. It is contemplated that injector body 60 may alternatively embody a multi-member element having one or more housing members, one or more guide members, and any other suitable number and/or type of structural members.

Nozzle portion 62 may likewise embody a cylindrical member having a central bore 100 and a pressure chamber 102. Central bore 100 may be configured to receive valve needle 76. Pressure chamber 102 may hold pressurized fuel supplied by passageway 98 in anticipation of an injection event. Nozzle portion 62 may also include one or more orifices 104 to allow the pressurized fuel to flow from pressure chamber 102 through central bore 100 into combustion chambers 22 of engine 10.

Plunger 72 may be slidingly disposed within bore 74 and movable by rocker arm 58 to pressurize fuel within bore 74. Specifically, as lobe 56 pivots rocker arm 58 about a pivot point 108, an end of rocker arm 58 opposite lobe 56 may urge plunger 72 against the bias of plunger spring 75 into bore 74, thereby displacing and pressurizing the fuel within bore 74. The fuel pressurized by plunger 72 may be selectively directed through fluid passageways 92-98 to spill valve 68, DOC valve 80, control chamber 90, supply/return line 88, and pressure chamber 102 associated with valve needle 76. As lobe 56 rotates away from rocker arm 58, plunger spring 75 may return plunger 72 upward out of bore 74, thereby drawing fuel back into bore 74.

Valve needle 76 may be an elongated cylindrical member that is slidingly disposed within central bore 100 of nozzle portion 62. Valve needle 76 may be axially movable between a first position at which a tip end of valve needle 76 blocks a flow of fuel through orifice 104, and a second position at which orifice 104 is open to allow a flow of fuel into combustion chamber 22. It is contemplated that valve needle 76 may be a multi-member element having a needle member and a piston member, or a single integral element.

Valve needle 76 may have multiple driving hydraulic surfaces. For example, valve needle 76 may include a hydraulic surface 106 located at a base end of valve needle 76 to drive valve needle 76 with the bias of the valve needle spring toward an orifice-blocking position when acted upon by pressurized fuel. Valve needle 76 may also include a hydraulic surface 105 that opposes the bias of the valve needle spring to drive valve needle 76 in the opposite direction toward a second or orifice-opening position when acted upon by pressurized fuel. When both hydraulic surfaces 105 and 106 are exposed to substantially the same fluid pressures, the force exerted by the valve needle spring on valve needle 76 may be sufficient to move valve needle 76 to and hold valve needle 76 in the orifice-blocking position.

Spill valve 68 may be disposed between fluid passageways 92 and 94 and configured to selectively allow fuel displaced from bore 74 to flow from fluid passageway 94 through fluid passageway 92 to supply/return line 88 where the pressurized fuel may exit fuel injector 32. Specifically, spill valve 68 may include a valve element 110 connected to first electrical actuator 64. Valve element 110 may have a region of enlarged diameter 110*a*, which is engageable with a valve seat 112 to selectively block the flow of pressurized fuel from fluid passageway 94 to fluid passageway 92. Movement of region 110*a* away from valve seat 112 may allow the pressurized fuel to flow from fluid passageway 94 to fluid passageway 92 and exit fuel injector 32 via supply/return line 88. When fuel forced from bore 74 is allowed to exit fuel injector 32 via supply/return line 88, the buildup of pressure within fuel injector 32 due to inward displacement of plunger 72 may be minimal. However, when the fuel is blocked from supply/return line 88, the displacement of fuel from bore 74 may result in an increase of pressure within fuel injector 32 to, for example, about 30,000 psi. Spill valve spring 70 may be situated to bias spill valve 68 toward the flow passing position.

First electrical actuator 64 may include a solenoid 114 and armature 116 for controlling motion of spill valve 68. In particular, solenoid 114 may include windings of a suitable shape through which current may flow to establish a magnetic field such that, when energized, armature 116 may be drawn toward solenoid 114. Armature 116 may be fixedly connected to valve element 110 to move region 110*a* of valve element 110 against the bias of spill valve spring 70 and into engagement with valve seat 112. It is contemplated that first electrical actuator 64 may embody another type of actuator such as, for example, a piezo motor, if desired.

DOC valve 80 may be disposed between fluid passageway 98 and control chamber 90, and configured to selectively block fuel displaced from bore 74 from flowing to control chamber 90, thereby facilitating fuel injection through orifice 104. Specifically, DOC valve 80 may include a valve element 118 connected to second electrical actuator 66. Valve element 118 may have a region of enlarged diameter 118*a*, which is engageable with a valve seat 120 to selectively block the flow of pressurized fuel into control chamber 90. When the pressurized fuel from fluid passageway 98 is blocked from control chamber 90, the fuel within control chamber 90 may be allowed to exit fuel injector 32 by way of fluid passageway 96 and supply/return line 88, thereby creating an imbalance of force on valve needle 76 that causes valve needle 76 to move against the spring bias toward the flow-passing position. Disengagement of region 118*a* from valve seat 120 may allow the pressurized fuel to flow from fluid passageway 98 into control chamber 90, the influx of pressurized fluid thereby returning valve needle 76 to the injection-blocking position. DOC spring 82 may be situated to bias DOC valve 80 toward the flow passing position.

Second electrical actuator 66 may include a solenoid 122 and armature 124 for controlling motion of DOC valve 80. In particular, solenoid 122 may include windings of a suitable shape through which current may flow to establish a magnetic field such that, when energized, armature 124 may be drawn toward solenoid 122. Armature 124 may be fixedly connected to valve element 118 to move region 118*a* of valve element 118 against the bias of DOC spring 82 and into engagement with valve seat 120. Similar to first electrical actuator 64, it is contemplated that first electrical actuator 64 may also embody another type of actuator such as, for example, a piezo motor, if desired.

Figure 3A:
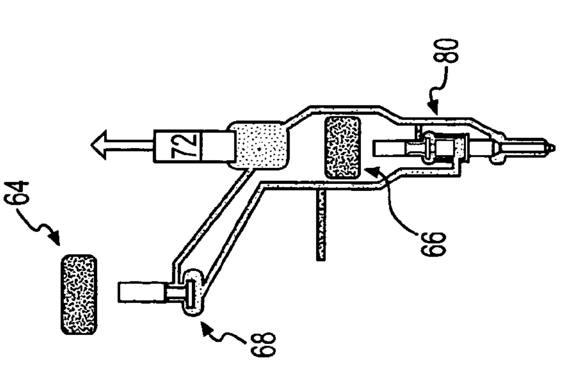
FIGS. 3A-3E are circuit diagrams for the fuel injector of FIG. 2.

In use, starting from the position illustrated in FIG. 3A, fuel injector 32 may fill with fuel when both of first and second electronic actuators 64, 66 are de-energized. In particular, as lobe 56 rotates away from rocker arm 58, plunger spring 75 may urge plunger 72 upward out of bore 74. The outward motion of plunger 72 from bore 74 may act to draw fuel from supply/return line 88 into bore 74 via fluid passageway 92, de-energized spill valve 68, and fluid passageway 94. During the filling operation of fuel injector 32, the forces caused by fluid pressures acting on the hydraulic surfaces of valve needle 76 may be substantially balanced, allowing for the valve needle spring to retain valve needle 76 in the orifice blocking position.

Figure 3B:
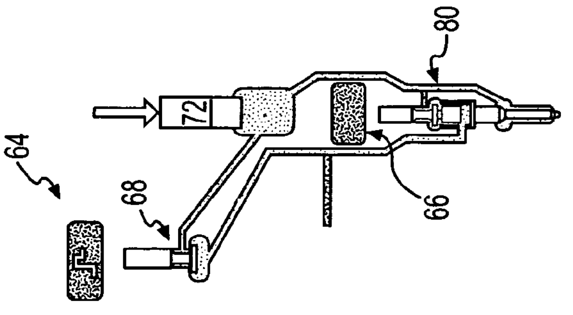

To pressurize the fuel within fuel injector 32, lobe 56 may rotate into engagement with rocker arm 58 to drive plunger 72 into bore 74, thereby displacing fuel from bore 74. If valve element 110 of spill valve 68 remains in the de-energized flow-passing position of FIG. 3A, the fuel displaced by plunger 72 may flow back through fluid passageways 94 and 92 to exit fuel injector 32 via supply/return line 88 without a substantial increase in pressure. However, if valve element 110 of spill valve is moved to the energized flow-blocking position during inward movement of plunger 72, as illustrated in FIG. 3B, the fuel displaced from bore 74 may be blocked from exiting fuel injector 32, thereby causing the pressure within fuel injector 32 to increase in proportion to the displacement of plunger 72. In order to prevent injection during pressurizing of the fuel within fuel injector 32, valve element 118 of DOC valve 80 may remain in the de-energized flow passing position to allow the buildup of pressure acting on hydraulic surface 106 to counteract the buildup of pressure acting on hydraulic surface 105, thereby allowing the valve needle spring to retain valve needle 76 in the orifice-blocking position.

Figure 3C:
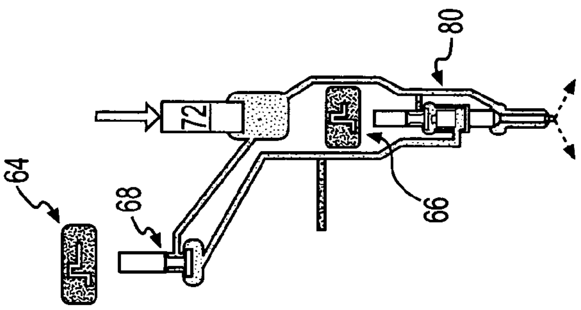

When injection is desired, second electrical actuator 66 may be energized to draw valve element 118 of DOC valve 80 into engagement with valve seat 120, as illustrated in FIG. 3C. In this energized state, the fuel pressurized by the inward movement of plunger 72 may be blocked from hydraulic surface 106, but allowed to remain in contact with hydraulic surface 105. After valve element 118 moves to the flow-blocking position, the pressure of the fuel within control chamber 90 may be reduced, as the fuel exits fuel injector 32 by way of supply passageway 98 and supply/return line 88. The imbalance of force created by the pressure differential on hydraulic surfaces 105, 106 of valve needle 76 may act to move valve needle 76 against the bias of the valve needle spring, thereby opening orifice 104 and initiating injection of the pressurized fuel into combustion chamber 22. The time at which valve needle 76 moves away from orifice 104 may correspond to the start of injection timing of fuel injector 32. The displacement of plunger 72 that occurs after valve element 110 has moved to the flow-blocking position and before valve element 118 of DOC valve 80 has moved to the flow-blocking position may correspond to the pressure of the fuel at the start of injection.

Figure 3D:
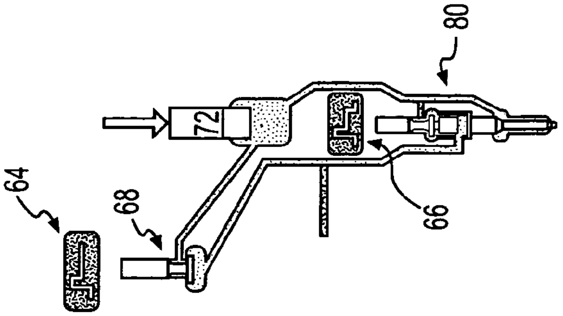

To end injection, second electrical actuator 66 may be de-energized to allow valve element 118 of DOC valve 80 to return to the flow-passing position under the bias of DOC spring 82, as illustrated in FIG. 3D. As valve element 118 moves to the de-energized flow-passing position, high pressure fuel may be reintroduced into control chamber 90, thereby allowing the valve needle spring to urge valve needle 76 to the orifice-blocking position. As valve needle 76 reaches the orifice-blocking position, the injection of fuel into combustion chamber 22 may terminate. The displacement of plunger 72 that occurs after valve needle 76 has moved to the flow-passing position and before valve needle 76 returns to the flow-blocking position may correspond to the amount of fuel injected into combustion chamber 22. The time at which valve needle 76 returns to the orifice-blocking position may correspond to the EOI timing of fuel injector 32. The EOI pressure may be a function of plunger velocity and the opening area of orifice 104.

Figure 3E:
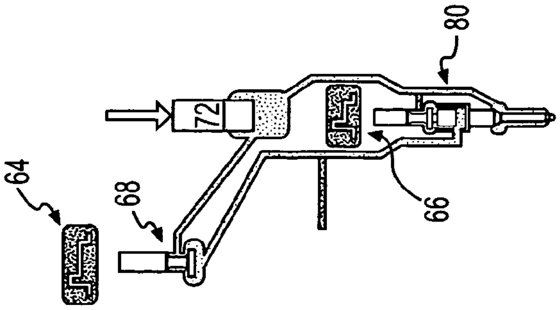

As illustrated in FIG. 3E, if plunger 72 continues to be driven downward into bore 74 by rocker arm 58 after valve element 118 of DOC valve 80 has moved to the flow-passing position, fuel displaced by plunger 72 may be allowed to exit fuel injector 32 via fluid passageway 98, control chamber 90, fluid passageway 96, and supply/return line 88. Almost immediately following the movement of valve element 118 to the flow-passing position, valve element 110 may likewise be moved to the flow-passing position to relieve the pressure of the fuel within fuel injector 32 and reduce the load on low pressure source 36. It is contemplated that if a particular end of injection pressure is desired, valve element 110 may be moved to the flow passing position at a predetermined plunger displacement distance before valve element 118 is moved to the flow passing position to vary (i.e., reduce) the pressure of the fuel discharged through orifice 104.

During operation of injector 32, it may be possible for DOC valve 80 to function improperly or not at all. Depending on the stage of injection, this malfunction could cause excessive pressures within injector 32. For example, during the pressurization stage illustrated in FIG. 3B, (e.g., after valve element 110 of spill valve 68 has been moved to the flow blocking position and while plunger 72 is being driven downward into bore 74 to displace and pressurize fuel), if DOC valve 80 fails to close (e.g., enlarged portion 118*a* of valve element 118 fails to engage seat 120), valve needle 76 may not open and, thus, may not provide any relief of the increasing pressure. As a result, the pressure of the fuel within injector 32 may continue to increase as plunger 74 continues its downward displacement, possibly to levels sufficient to damage the components of fuel injector 32.

In order to minimize the likelihood of damage to fuel injector 32, controller 53 may prematurely open spill valve 68 in the event of DOC valve failure. Specifically, controller may monitor the level of current passing through second electrical actuator 66 and compare the current level to a predetermined current range. The predetermined current range may correspond with proper operation of electrical actuator 66 and, thus, successful engagement of enlarged portion 118*a* with valve seat 120. If the current passing through electrical actuator 66 deviates from the predetermined current range, it may be concluded that the attempt to move valve element 118 of DOC valve 80 to the flow blocking position was unsuccessful. If the attempt to block pressurized fuel from control chamber 90 is determined to be unsuccessful, controller 53 may then de-energize first electrical actuator 64 associated with spill valve 68 after the current injection shot to prevent subsequent shots and prematurely halt the injection event by relieving the building pressures within fuel injector 32.

Controller 53 may be configured to log a fault if an unsuccessful attempt to inject fuel has been detected. In particular, if controller 53 prematurely halts an injection event because of DOC valve failure, controller 53 may log a fault condition within its memory. Upon logging a predetermined number of fault conditions such as, for example, five fault conditions, controller 53 may then provide a fault warning to an operator of engine 10 indicating an operational problem.

Figure 4:
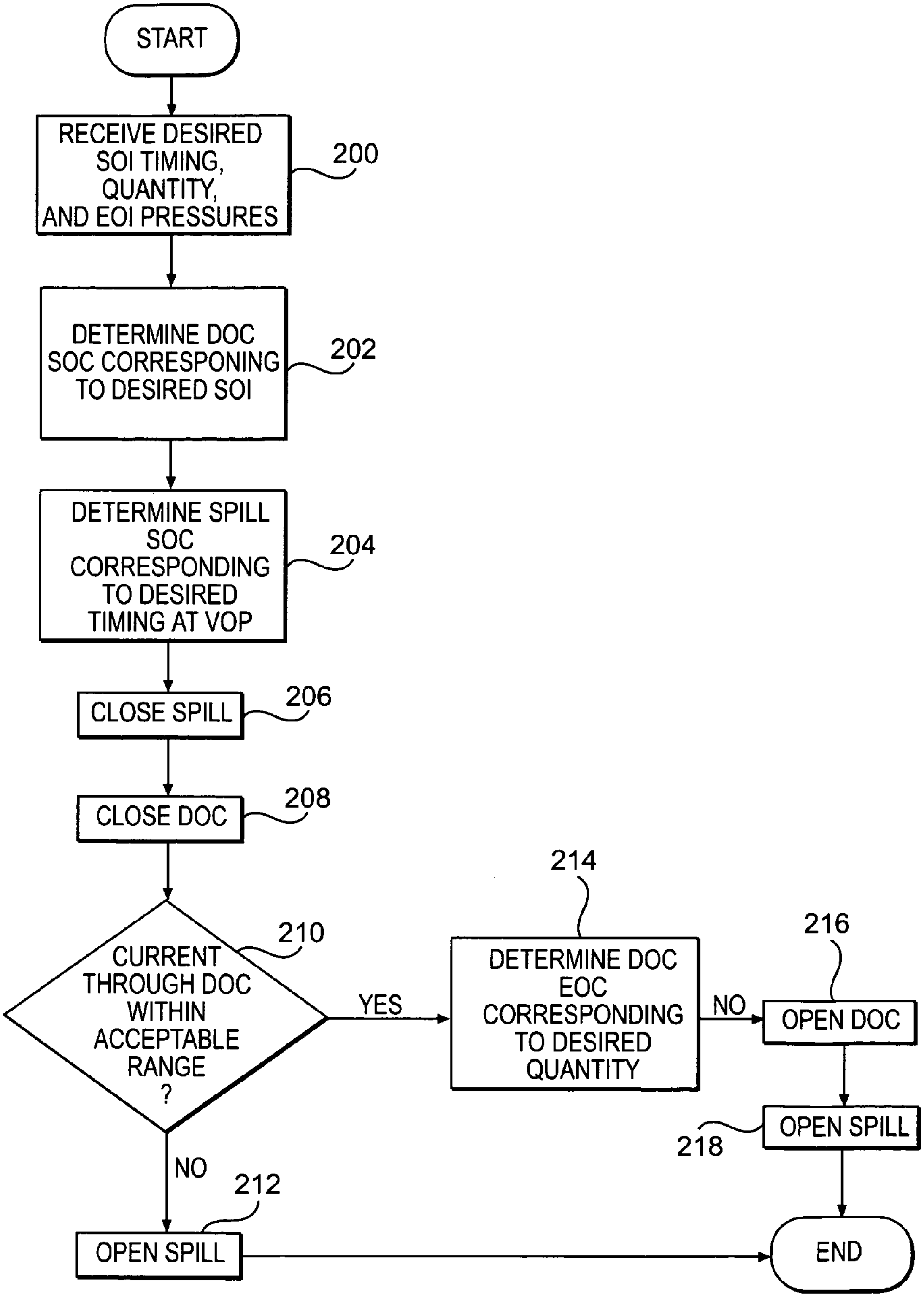
FIG. 4 is a flow chart depicting an exemplary method of operating the fuel injector of FIG. 2.

FIG. 4 illustrates an exemplary method of operating fuel injector 32. FIG. 4 will be discussed in detail below.

INDUSTRIAL APPLICABILITY

The fuel injector and control system of the present disclosure have wide application in a variety of engine types including, for example, diesel engines, gasoline engines, and gaseous fuel-powered engines. The disclosed fuel injector and control system may be implemented into any engine where consistent, accurate fuel injector performance and continuing successful operation of the injector are important. The operation of control system 35 will now be explained.

As indicated in the flow chart of FIG. 4, a controlled injection event may start by first receiving an indication of a desired start of injection (SOI) timing, a desired injection amount, a desired SOI pressure, and/or a desired end of injection (EOI) pressure (step 200). For example, engine 10 may request an SOI corresponding to a particular position of piston 18 within combustion chamber 22. Similarly, engine 10 may request a specific quantity of fuel, an SOI pressure, and/or an EOI pressure. These requested (e.g., desired) injection characteristics may be received by controller 53 in preparation for injection.

After receiving the desired fuel injection characteristics, controller 53 may determine a start of current (SOC) for second electrical actuator 66 that will move valve element 118 of DOC valve 80 to the closed position and initiate injection at the desired SOI timing (step 202). As indicated above, movement of valve element 118 of DOC valve 80 toward the energized flow-blocking position may cause movement of valve needle 76 toward the orifice-opening position, thereby initiating injection of fuel into combustion chamber 22. Controller 53 may determine the SOC by offsetting the desired SOI by system delays associated with DOC valve 80 and valve needle 76.

Following the determination of the SOC for second electrical actuator 66, controller 53 may determine an SOC for first electrical actuator 64 associated with spill valve 68 that results in the desired pressure at SOI (step 204). As indicated above, the amount of displacement of plunger 72 into bore 74 after valve element 110 has been moved to the flow-blocking position and before valve element 118 has been moved to the flow-blocking position may correspond to the pressure at SOI. Controller 53 may be programmed with geometric relationships between an angular position of crankshaft 24, a stroke length and area of plunger 72, and/or a displacement position of plunger 72 within bore 74. From these geometric relationships and the desired SOI, controller 53 may calculate an SOC for first electrical actuator 64 in terms of crank angle and/or displacement of plunger 72. When plunger 72 moves through the displacement between SOC and SOI, fuel displaced from bore 74 may increase in pressure to the desired SOI pressure before valve needle 76 moves to inject the pressurized fuel into combustion chamber 22. Controller 53 may be further configured to account for delays associated with spill valve 68 when determining SOC of first electrical actuator 64.

Following the determination SOC for both first and second electrical actuators 64, 66 associated with spill and DOC valves 68, 80, controller 53 may energize first and second electrical actuators 64, 66 to close spill and DOC valves 68, 80 at the calculated angular or displacement SOC timings (steps 206, 208). After closing spill valve 68, the movement of plunger 72 through the determined displacement may build the pressure of the fuel within fuel injector 32 to the desired SOI pressure. After plunger 72 has reached the determined displacement position, DOC valve 80 may close to initiate the injection of fuel into combustion chamber 22 at the desired SOI timing.

If controller 53 detects a malfunction of fuel injector 32, controller 53 may prematurely halt the current injection event. In particular, controller 53 may monitor the current directed through second electrical actuator 66 and compare the monitored current to the predetermined current range described above (Step 210). If the monitored current deviates from the predetermined current range, controller 53 may determine that DOC valve 80 is malfunctioning. If DOC valve 80 is malfunctioning, controller 53 may then, after the current injections shot, open spill valve 68 to relieve the pressure within fuel injector 32 (Step 212) and prevent subsequent injection shots within the same injection event.

However, if the monitored current remains within the predetermined current range, it can be concluded that DOC valve 80 has successfully closed, and controller 53 may determine an EOI timing that corresponds with injection of the desired quantity of fuel. Using the geometric relationships described above, controller 53 may calculate the angle through which crankshaft 24 must turn and/or the displacement through which plunger 72 must move after SOI to push the desired amount of fuel through orifice 104. Controller 53 may then calculate an end of current (EOC) that accounts for delays associated with DOC valve 80 such that by the end of the injection at the determined EOI timing, the proper amount of fuel has been injected into combustion chamber 22 (step 214).

Controller 53 may end injection by terminating the current supplied to second electrical actuator 66 at the calculated EOC timing (step 216) such that valve element 118 moves to the open position in time for valve needle 76 to block orifice 104 at the EOI timing. In this situation, the EOI pressure is not specifically controlled, but rather dependent upon a displacement velocity of plunger 72 and an area of orifice 104. Immediately following the implementation of EOC for second electrical actuator 66, controller 53 may implement EOC for first electrical actuator 64 to move valve element 110 to the open position and relieve pressure within fuel injector 32 (step 214).

It will be apparent to those skilled in the art that various modifications and variations can be made to the fuel injector and control system of the present disclosure without departing from the scope of the disclosure. Other embodiments will be apparent to those skilled in the art from consideration of the specification and practice of the fuel injector and control system disclosed herein. It is intended that the specification and examples be considered as exemplary only, with a true scope of the disclosure being indicated by the following claims and their equivalents.

What is claimed is:

1. A fuel injector, comprising:

a plunger reciprocatingly disposed within a bore;

a nozzle member having a tip end with at least one orifice;

a valve needle having a base end and tip end, being disposed within the nozzle member, and movable against a spring bias from a flow blocking position at which substantially no fuel flows through the at least one orifice, to a flow passing position at which fuel flows through the at least one orifice;

a check valve in fluid communication with the bore and the base end of the valve needle, the check valve movable between a first position at which the base end of the valve needle is fluidly communicated with the bore, and a second position at which the base end of the valve needle is fluidly communicated with a drain;

a spill valve associated with the bore and movable between a first position at which fuel flows from the bore to the drain, and a second position at which the fuel from the bore is blocked from the drain; and a controller in communication with the check valve and the spill valve, the controller being configured to:

move the spill valve toward its second position during a downward displacing movement of the plunger to build pressure within the bore;

move the check valve toward its second position during the downward displacing movement of the plunger;

detect an unsuccessful movement of the check valve to the second position; and prematurely halt a current injection event in response to the detection.

2. The fuel injector of claim 1, wherein the check valve is electronically controlled and the controller moves the check valve by directing current to the check valve.

3. The fuel injector of claim 2, wherein the controller detects an unsuccessful movement by comparing a current level through the check valve to a predetermined current range.

4. The fuel injector of claim 3, wherein the controller halts the current injection by returning the spill valve to its first position.

5. The fuel injector of claim 4, wherein the controller is configured to return the spill valve to its first position, if the current level through the check valve deviates from the predetermined current range.

6. The fuel injector of claim 2, wherein the spill valve is also electronically controlled and the controller moves the spill valve by directing a current to the spill valve.

7. The fuel injector of claim 1, wherein the controller is further configured to log a fault in a memory thereof each time the fuel injection event is prematurely halted.

8. The fuel injector of claim 1, wherein the controller is further configured to send a fault signal to an operator of an associated engine only after multiple faults have been logged.

9. The fuel injector of claim 1, wherein the plunger is mechanically cam driven to reciprocate.

10. A method of operating a fuel injector, comprising:

displacing fuel;

blocking a flow of the displaced fuel to pressurize the displaced fuel;

directing the pressurized fuel to at least one orifice and to the base end of a valve needle blocking the at least one orifice;

attempting to lower the pressure of the fuel at the base end of the valve needle to allow the pressurized fuel to flow through the at least one orifice;

detecting an unsuccessful attempt to lower the pressure; and prematurely unblocking the flow of displaced fuel in response to the detection.

11. The method of claim 10, wherein the steps of blocking and attempting both include generating an electronic command signal and directing the electronic command signal to a valve element.

12. The method of claim 11, wherein the step of detecting includes comparing the value of the electronic command signal received back from the valve element to a predetermined signal range.

13. The method of claim 12, wherein the step of prematurely unblocking includes is carried out if the comparison indicates that the electronic command signal received back from the valve element deviates from the predetermined signal range.

14. The method of claim 10, further including logging a fault each time the flow of displaced fuel is prematurely unblocked.

15. The method of claim 14, further including sending a fault signal to an operator of an associated engine only after multiple faults have been logged.

16. An internal combustion engine, comprising:

an engine block having at least one combustion chamber; and a fuel injector configured to selective inject fuel into the at least one combustion chamber, the fuel injector including:

a plunger reciprocatingly disposed within a bore;

a cam mechanism operatively connected to reciprocatingly drive the plunger in the bore;

a nozzle member having a tip end with at least one orifice;

a valve needle having a base end and tip end, being disposed within the nozzle member, and movable against a spring bias from a flow blocking position at which substantially no fuel flows through the at least one orifice, to a flow passing position at which fuel flows through the at least one orifice;

a check valve in fluid communication with the bore and the base end of the valve needle, the check valve movable between a first position at which the base end of the valve needle is fluidly communicated with the bore, and a second position at which the base end of the valve needle is fluidly communicated with a drain;

a spill valve associated with the bore and movable between a first position at which fuel flows from the bore to the drain, and a second position at which the fuel from the bore is blocked from the drain; and a controller in communication with the check valve and the spill valve, the controller being configured to:

move the spill valve toward its second position during a downward displacing movement of the cam-driven plunger to build pressure within the bore;

move the check valve toward its second position during the downward displacing movement of the cam-driven plunger;

detecting an unsuccessful movement of the check valve to the second position; and prematurely halt the current injection event in response to the detection.

17. The internal combustion engine of claim 16, wherein the check valve and the spill valve are both electronically controlled and the controller moves the check valve and the spill valve by directing currents to the check valve and the spill valve.

18. The internal combustion engine of claim 17, wherein:

the controller detects an unsuccessful movement by comparing a current level through the check valve to a predetermined current range;

the controller halts the current injection by returning the spill valve to its first position; and the controller returns the spill valve to its first position, if the current level through the check valve deviates from the predetermined current range.

19. The internal combustion engine of claim 16, wherein the controller is further configured to log a fault in a memory thereof each time the fuel injection event is prematurely halted.

20. The internal combustion engine of claim 19, wherein the controller is further configured to send a fault signal to an operator of an associated engine only after multiple faults have been logged.

* * * * *